(12) United States Patent
Volz

(10) Patent No.: US 11,135,909 B2
(45) Date of Patent: Oct. 5, 2021

(54) STORAGE CELL UNIT FOR A MOTOR VEHICLE AND MOTOR VEHICLE COMPRISING A STORAGE CELL UNIT

(71) Applicant: Bayerische Motoren Werke Aktiengesellschaft, Munich (DE)

(72) Inventor: Karlheinz Volz, Inning am Ammersee (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1007 days.

(21) Appl. No.: 14/857,869

(22) Filed: Sep. 18, 2015

(65) Prior Publication Data

US 2016/0006008 A1    Jan. 7, 2016

Related U.S. Application Data

(63) Continuation of application No. PCT/EP2014/054544, filed on Mar. 10, 2014.

(30) Foreign Application Priority Data

Mar. 19, 2013  (DE) ............... 10 2013 204 765.7

(51) Int. Cl.
*B60K 1/04* (2019.01)
*H01M 50/20* (2021.01)
*H01M 50/24* (2021.01)

(52) U.S. Cl.
CPC ............... *B60K 1/04* (2013.01); *H01M 50/20* (2021.01); *H01M 50/24* (2021.01); *B60Y 2306/01* (2013.01); *H01M 2200/00* (2013.01); *H01M 2220/20* (2013.01)

(58) Field of Classification Search
CPC . B60K 1/04; B60Y 2306/01; H01M 2200/00; H01M 2220/20; H01M 2/1077; H01M 2/1083; H01M 2/1094
See application file for complete search history.

(56) References Cited

U.S. PATENT DOCUMENTS 6,648,090 B2 * 11/2003 Iwase ...................... B60K 1/04
                                                              180/68.5
2008/0283318 A1   11/2008 Wagner et al.
(Continued)

FOREIGN PATENT DOCUMENTS

DE   10 2007 023 392 A1   11/2008
DE   10 2009 043 635 A1    4/2011
(Continued)

OTHER PUBLICATIONS

Kuchenbuch et al., Arrangement for traction battery in electrically driven motor vehicle, particularly electrically-powered passenger vehicle, has battery placed in battery container at underbody of vehicle structure, May 10, 2012, Patent Translate powered by EPO, (Year: 2012).*

(Continued)

*Primary Examiner* — Adam A Arciero
(74) *Attorney, Agent, or Firm* — Crowell & Moring LLP

(57) ABSTRACT

A storage cell unit for a motor vehicle having an electric drive has a housing, in which storage cells are arranged. The housing has an energy absorption region, which is deformable in event of a collision for the purpose of energy absorption.

13 Claims, 1 Drawing Sheet

(56) References Cited

U.S. PATENT DOCUMENTS

| | | | | |
|---|---|---|---|---|
| 2012/0006607 A1* | 1/2012 | Ohashi | ............ | B60K 1/04 180/65.31 |
| 2013/0026786 A1* | 1/2013 | Saeki | ............ | B60K 1/04 296/187.12 |
| 2013/0040189 A1* | 2/2013 | Lim | ............ | H01M 2/1077 429/163 |
| 2013/0043702 A1* | 2/2013 | Hettinger | ............ | B60K 1/04 296/187.12 |
| 2013/0199864 A1* | 8/2013 | Enning | ............ | B60K 1/04 180/271 |

FOREIGN PATENT DOCUMENTS

| | | |
|---|---|---|
| DE | 10 2009 053 138 A1 | 5/2011 |
| DE | 10 2011 016 081 A1 | 11/2011 |
| DE | 10 2010 033 806 A1 | 2/2012 |
| DE | 10 2010 050 826 A1 | 5/2012 |
| DE | 10 2011 077 400 A1 | 12/2012 |
| EP | 2 072 308 A2 | 6/2009 |
| EP | 2 244 318 A2 | 10/2010 |
| EP | 2 371 599 A1 | 10/2011 |
| JP | 7-117489 A | 5/1995 |
| JP | 2006-182295 A | 7/2006 |

OTHER PUBLICATIONS

Kuchenbuch et al., Arrangement for traction battery in electrically driven motor vehicle, particularly electrically-powered passenger vehicle, has battery placed in battery container at underbody of vehicle structure, May 10, 2012, machine translation provided by Espacenet (Year: 2012).*

International Search Report dated Jun. 30, 2014 with English translation (Six (6) pages).

German-language search report dated Nov. 20, 2013 with partial English translation (Ten (10) pages).

* cited by examiner

STORAGE CELL UNIT FOR A MOTOR VEHICLE AND MOTOR VEHICLE COMPRISING A STORAGE CELL UNIT

CROSS REFERENCE TO RELATED APPLICATIONS

This application is a continuation of PCT International Application No. PCT/EP2014/054544, filed Mar. 10, 2014, which claims priority under 35 U.S.C. §119 from German Patent Application No. 10 2013 204 765.7, filed Mar. 19, 2013, the entire disclosures of which are herein expressly incorporated by reference.

BACKGROUND AND SUMMARY OF THE INVENTION

The present invention relates to a storage cell unit for a motor vehicle with an electric drive, which storage cell unit has a housing in which storage cells are arranged, and to a motor vehicle with a storage cell unit of this type.

Known electric vehicles have what is referred to as a traction battery which serves for storing electrical energy for an electric drive or electric motor of the motor vehicle. Traction batteries of this type are constructed from battery cells which, in turn, are combined to form battery modules. The battery cells or battery modules are accommodated in a housing which serves to protect the battery cells and contains devices which serve for the air conditioning and control of the battery cells. For example, a battery assembly of this type consisting of a housing and battery cells is arranged in a floor region of a motor vehicle between the front and rear axle of the motor vehicle. An energy store of this type for a motor vehicle is described in EP 2 244 318 A2.

Furthermore, it is known, as shown in DE 102010033806 A1, to construct a battery pack for motor vehicles from a multiplicity of battery elements, wherein deformation elements are arranged between at least two adjacent battery elements. The deformation elements are able to absorb energy by way of deformation in the event of an accident of the motor vehicle.

It is the object of the present invention to provide a storage cell unit and a motor vehicle with a storage cell unit of this type, wherein, in the event of a collision, collision energy can be dissipated by the storage cell unit.

This and other objects are achieved by a storage cell unit for a motor vehicle, which storage cell unit has a housing in which storage cells are arranged, wherein the housing has an energy absorption region which is designed to be deformable in the event of a collision in order to absorb energy. Furthermore, this object is achieved by a motor vehicle wherein the housing is connected to a left, outer longitudinal member and to a right, outer longitudinal member, and wherein, in particular, a left energy absorption region is formed adjacent to the left, outer longitudinal member and a right energy absorption region is formed adjacent to the right, outer longitudinal member.

According to the present invention, a storage cell unit for a motor vehicle with an electric drive has a housing in which storage cells are arranged. The housing furthermore has an energy absorption region which is designed to be deformable in the event of a collision in order to absorb energy.

A storage cell unit is a unit for storing electrical energy for driving an electric motor of the motor vehicle. The storage cell unit can have a battery and also a capacitor for storing electrical energy. The energy absorption region can be designed here both for absorbing energy in the event of a collision of the storage cell unit during transport and also in the event of a collision of the motor vehicle in the installed state of the storage cell unit. The energy absorption region of the housing in particular forms what is referred to as a crumple zone or deformation zone of the housing. The energy absorption region here is, in particular, a wall element, for example an outer wall element, of the housing, which is designed to be correspondingly deformable.

In the case of the storage cell unit according to the present invention, the energy absorption region can preferably be formed in a region of the housing, in which no storage cells are arranged.

A deformation of the energy absorption region of the housing therefore does not impair the region in which the storage cells are arranged and therefore prevents damage of the storage cells. The housing can therefore dissipate collision energy without the storage cells or devices connected thereto being damaged.

The energy absorption region is preferably formed on outer edge regions of the housing. The energy absorption region can be formed, for example, on a left lateral edge, a right lateral edge, a front edge and/or a rear edge of the housing.

The housing advantageously has a storage cell protection region in which the storage cells are arranged and which is designed not to be deformable in the event of the collision. In other words, the storage cell unit has an energy absorption region which is designed to be deformable and a storage cell protection region which is designed not to be deformable. Deformable and not deformable therefore means, in particular, the deformability or non-deformability in conjunction with a specific collision situation. Collision situations of this type can be predetermined by standardized collision tests or the like.

The storage cells are therefore adequately protected in the housing.

According to a further preferred development of the storage cell unit of the present invention, the housing is designed to be protected in relation to external environmental influences, in particular in a solids-tight, liquid-tight and/or gas-tight manner. In particular, environmental influences to which the storage cell unit are exposed during the operation of the motor vehicle, such as, for example, dust, dirt, water and the like, are meant here.

Furthermore, the storage cell unit according to the present invention can preferably have accommodated an electric control device which, in particular, is not arranged in the energy absorption region, in the housing. The electric control device can be a storage cell control device. In particular, the electric control device is arranged in the storage cell protection region.

It is therefore ensured that the electric control device is not damaged in the event of a collision.

The housing of the storage cell unit can preferably be composed of steel, aluminum and/or a fiber-reinforced plastic.

Furthermore, the housing of the storage cell unit according to the present invention can have intermediate walls which can be designed so as to reinforce the storage cell unit. Furthermore, the intermediate walls, if they are arranged in the energy absorption region, can be designed to be deformable for absorbing energy while the intermediate walls, if they are arranged in the storage cell protection region, can be designed so as not to be deformable.

The housing can consist in particular of a bottom wall, i.e. a lower wall, an upper wall and side walls. The intermediate walls already mentioned can extend here between the bottom wall and the upper wall.

An energy absorption region is preferably formed here in the bottom wall and/or in the upper wall close to the side walls of the housing. The abovementioned storage cell protection region is therefore formed at a distance from the side walls in a central region of the housing between the bottom wall and the upper wall while a left, right, front and/or rear energy absorption region can be formed at the lateral edges of the housing.

The intermediate walls can separate storage cell modules, which are constructed from storage cells, from one another in the storage cell protection region.

The side walls can be of profiled design and/or designed in the form of a hollow carrier. In particular, the side walls can be of double-walled design. The side walls can also be part of the energy absorption region.

The above object is furthermore achieved by a motor vehicle with a storage cell unit which is described above together with developments thereof, wherein the housing is adapted in such a manner that the housing is fixed or connected to a left, outer longitudinal member and a right, outer longitudinal member. An outer longitudinal member is also referred to in general as a side sill and is the outermost lower longitudinal member of a motor vehicle body. In other words, a left side wall and a right side wall of the housing are fastened to the respective outer longitudinal members. A left energy absorption region which is formed adjacent to the left, outer longitudinal member and, in particular, extends parallel to the left, outer longitudinal member is preferably formed in the housing. Equally, a right energy absorption region which extends adjacent to and, in particular, parallel to the right, outer longitudinal member can be formed in the housing.

According to a preferred embodiment of the motor vehicle of the present invention, the housing is connected directly or indirectly to a front longitudinal member pair. A front longitudinal member of a motor vehicle is also called an engine bracket in motor vehicles which have a front engine. In other words, the housing is connected directly or indirectly to a rear end of the front longitudinal member pair. In particular, the housing can have a front energy absorption region which is formed adjacent to the rear end of the front longitudinal member pair. In particular, in the region of a front side wall of the housing, the front energy absorption region can extend in a direction transversely with respect to the front longitudinal member pair.

Additionally or alternatively, the housing can be connected directly or indirectly to a rear longitudinal member pair. In particular, it can be connected directly or indirectly to the front end of the rear longitudinal member pair. A rear energy absorption region of the housing can be formed here adjacent to the front end of the rear longitudinal member pair. In particular, the rear energy absorption region can extend transversely with respect to the rear longitudinal member pair. The rear energy absorption region can be formed here in the region of a rear side wall of the housing.

In the case of the motor vehicle of the present invention, the housing is preferably designed in such a manner that the housing increases a torsional rigidity and/or a flexural rigidity of a motor vehicle body of the motor vehicle.

The housing can be designed in particular in such a manner that it has the function of a structural body crossmember which extends between the left, outer longitudinal member and the right, outer longitudinal member of the vehicle body. In other words, the housing itself can be a crossmember between the outer longitudinal members.

According to a preferred embodiment of the motor vehicle of the present invention, a connecting region of the housing to the left, outer longitudinal member and to the right, outer longitudinal member is designed in such a manner that the connecting region increases an effective cross section of the left, outer longitudinal member and of the right, outer longitudinal member. In other words, the housing contributes to a function of the longitudinal member in respect of collision strength. This is advantageous in particular if the left side wall and the right side wall of the housing are of profiled design and/or are designed in the form of a hollow carrier.

In the case of the motor vehicle of the present invention, the housing is preferably designed in such a manner that, in the event of a side collision, the energy absorption region is deformable in order to dissipate collision energy. On the other hand, the storage cell protection region is not designed to be deformable in order to protect the storage cells in the event of the collision. This is true in any type of collision of the motor vehicle, a side collision, a frontal collision or a rear collision, which includes a frontal collision with a small overlap.

The above-described features and developments of the invention can be suitably combined with one another as far as possible.

Other objects, advantages and novel features of the present invention will become apparent from the following detailed description of one or more preferred embodiments when considered in conjunction with the accompanying drawings.

DETAILED DESCRIPTION OF THE DRAWINGS

A description of an exemplary embodiment of the present invention is undertaken below.

Figure 1:
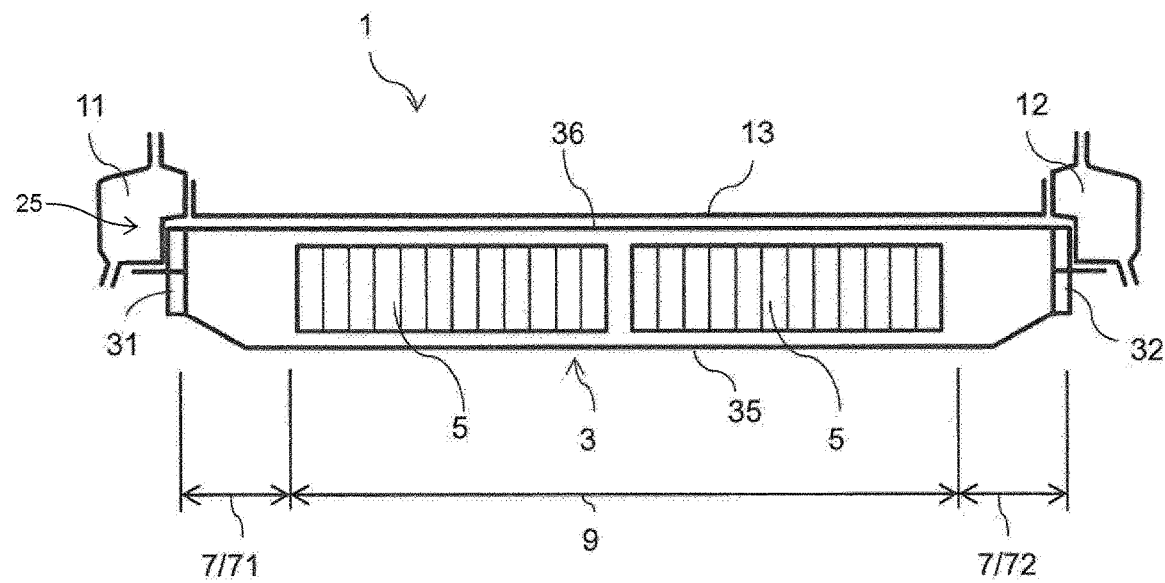
FIG. 1 is a schematic sectional view of a storage cell unit according to an exemplary embodiment of the invention along a transverse, vertical axis of a vehicle.

FIG. 1 shows a storage cell unit 1, which is installed in a motor vehicle body of a motor vehicle, according to the exemplary embodiment in a sectional view in the transverse direction and vertical direction of the vehicle. The storage cell unit 1 has, in particular, a housing 3 which is sealed in relation to environmental influences and has a left side wall 31, a right side wall 32, a front side wall 33 (see FIG. 2), a rear side wall 34 (see FIG. 2), a bottom wall 35 and an upper wall 36. Storage cells 5 are arranged in the housing 3. In particular, the storage cells 5 are arranged in storage cell assemblies or modules. A plurality of storage cell modules are accommodated in the housing 3.

Figure 2:
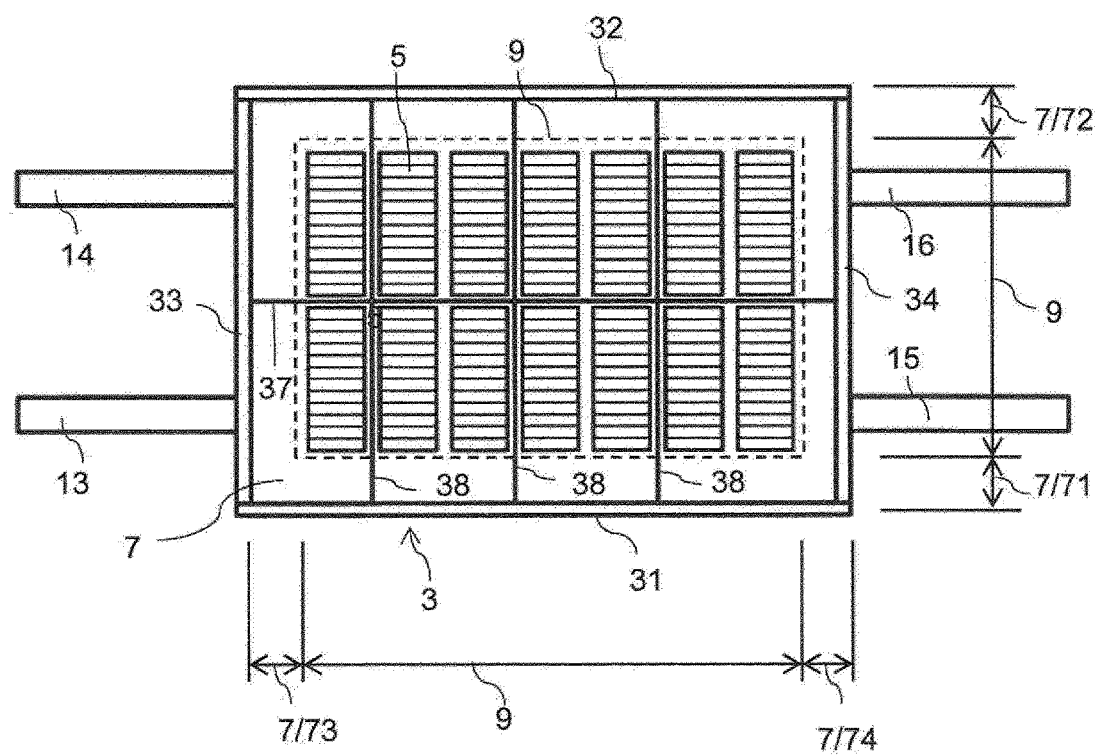
FIG. 2 is a schematic top view of a storage cell unit according to the exemplary embodiment of the present invention.

As shown in FIG. 1 and FIG. 2, an energy absorption region 7 is formed close to the side walls 31, 32, 33, 34. A storage cell protection region 9 is formed in a middle or central region (with respect to the longitudinal and transverse direction of the vehicle) of the housing, as is apparent in particular from FIG. 2 (within the dashed line in FIG. 2). In other words, the storage cells 9 are formed at a distance from the side walls 31, 32, 33, 34. As is furthermore shown in FIG. 2, the housing 3 has intermediate walls 38 which run parallel to the front side wall 33 and to the rear side wall 34 and connect the bottom wall 35 and the upper wall 36 to each other. Also shown is a longitudinal intermediate wall 37 which runs between the front side wall 33 and the rear side wall 34 or between the upper wall 36 and the bottom wall 35. The intermediate walls 37, 38 have a function for reinforcing the housing 3. The number, arrangement and orientation of the intermediate walls can be changed depending on requirements.

Furthermore, one or more storage cell control devices which serve to control the storage cells 5 are accommodated in the storage cell protection region 9.

The energy absorption region 7 is divided, in particular, into a left energy absorption region 71, a right energy absorption region 72, a front energy absorption region 73 and a rear energy absorption region 74. The energy absorption regions are, in each case, formed between the adjacent outer side wall and the storage cell protection region 9.

As is shown in FIG. 1, the housing 3 is connected to a left side sill 11 and to a right side sill 12. In particular, the left side wall 31 is connected to the side sill 11, and the right side wall 32 is connected to the side sill 12. As indicated schematically, the side walls 31, 32, 33, 34 are preferably of double-walled design. Furthermore, the side sills 11 and 12 are connected to each other by a floor panel 13 of the vehicle body.

Furthermore, the front side wall 33 is connected directly or indirectly to a front longitudinal member pair 13, 14, and the rear wall 34 is connected directly or indirectly to a rear longitudinal member pair 15, 16.

The housing 3 as a whole is designed in such a manner that it acts as a crossmember between the longitudinal members 11 and 12. In particular, the housing has a reinforcing effect on the vehicle body as a whole. The housing increases a torsional rigidity and a flexural rigidity of the vehicle body. Furthermore, by connecting the side walls 31 and 32 into the longitudinal members 11 and 12, the cross section of the latter can even be of smaller design since connecting regions 25 of the housing 3 and the side walls serve as an addition to the lateral longitudinal members 11, 12.

The deformation regions 71, 72, 73, 74 are designed in such a manner that they can dissipate collision energy by way of deformation in the event of a side collision, a frontal collision or a rear collision. In particular, the corresponding side walls 31, 32, 33, 34 are designed to be deformable. Furthermore, the respective sections of the bottom wall 35 and of the upper wall 36 of the housing 3 located in the energy absorption region 7 are designed to be deformable, for example foldable. On the other hand, the bottom wall 35 and the upper wall 36 are designed not to be deformable in the region of the storage cell protection region 9. That is to say, in the event of the collisions described, the bottom wall 35 and the upper wall 36 are of sufficiently stiff design in the region of the storage cell protection region 9 that there is no deformation during the corresponding collisions and the storage cells 5 remain protected. The intermediate walls 38 and 37 here can have an assisting effect.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A storage cell unit for a motor vehicle equipped with an electric drive, the storage cell unit comprising:
    a self-contained storage cell housing configured to be installed in the motor vehicle, wherein
    the storage cell housing comprises an energy absorption region configured to be deformable in an event of a collision in order to absorb energy, wherein the energy absorption region is formed by a wall element of the housing,
    the storage cell housing further comprises a storage cell protection region in which storage cells are arranged, a wall element of the storage cell protection region of the housing being configured so as not to be deformable in the event of the collision, and
    wherein the energy absorption region is located laterally relative to at least a portion of the storage cells.

2. The storage cell unit according to claim 1, wherein
    the energy absorption region is provided in a region of the housing in which no storage cells are arranged, and
    the energy absorption region is located in outer edge regions within the housing.

3. The storage cell unit according to claim 1, wherein the housing is sealed against external environmental influences.

4. The storage cell unit according to claim 3, wherein the housing is configured to be at least one of solids-tight, liquid-tight or gas-tight.

5. The storage cell unit according to claim 1, further comprising:
    an electronic control device that controls the storage cell unit, wherein
    the electronic control device is accommodated in the housing but is not arranged in the energy absorption region.

6. The storage cell unit according to claim 1, wherein the housing is composed of steel, aluminum, and/or a fiber-reinforced plastic.

7. A storage cell unit for a motor vehicle equipped with an electric drive, the storage cell unit comprising:
    a self-contained storage cell housing configured to be installed in the motor vehicle, wherein
    the storage cell housing comprises an energy absorption region configured to be deformable in an event of a collision in order to absorb energy, wherein the energy absorption region is formed by a wall element of the housing,
    the storage cell housing further comprises a storage cell protection region in which the storage cells are arranged, a wall element of the storage cell protection region of the housing being configured so as not to be deformable in the event of the collision,
    wherein the housing is sealed against external environmental influences, and
    wherein the housing is configured to be at least one of solids-tight, liquid-tight or gas-tight.

8. A motor vehicle with an electric drive, comprising:
    a storage cell unit comprising a self-contained storage cell housing in which storage cells are arranged, the storage cell housing having an energy absorption region configured to be deformable in an event of a collision in order to absorb energy, wherein the energy absorption region is formed by a wall element of the housing,
    the storage cell housing further having a storage cell protection region in which the storage cells are arranged, a wall element of the storage cell protection region of the housing being configured so as not to be deformable in the event of the collision;

a left outer longitudinal member of a vehicle body of the motor vehicle;

a right outer longitudinal member of a vehicle body of the motor vehicle, wherein the housing is connected to the left outer longitudinal member and to the right outer longitudinal member, in which case a left energy absorption region within the housing is formed adjacent to the left outer longitudinal member and a right energy absorption region within the housing is formed adjacent to the right outer longitudinal member, the left and right energy absorption regions being located laterally relative to the storage cells.

9. The motor vehicle according to claim 8, further comprising:

a front longitudinal member pair of the motor vehicle;

a rear longitudinal member pair of the motor vehicle, wherein the housing is connected to the front longitudinal member pair and/or to the rear longitudinal member pair, in which case a front energy absorption region in the housing is formed adjacent to the front longitudinal member pair and/or a rear energy absorption region in the housing is formed adjacent to the rear longitudinal member pair.

10. The motor vehicle according to claim 9, wherein the housing is configured to increase a torsional rigidity and/or flexural rigidity of the vehicle body of the motor vehicle.

11. The motor vehicle according to claim 9, wherein the housing is designed as a structural body crossmember for the motor vehicle, the structural body crossmember extending between the left outer longitudinal member and the right outer longitudinal member of the vehicle body of the motor vehicle.

12. The motor vehicle according to claim 11, wherein a connecting region of the housing to the left outer longitudinal member and a connecting region to the right outer longitudinal member are configured so as to increase an effective cross-section of the left outer longitudinal member and the right outer longitudinal member, respectively.

13. The motor vehicle according to claim 8, wherein the housing is configured such that, in an event of a side, frontal, and/or rear collision, the energy absorption region of the housing is deformable and a storage cell protection region of the housing that protects the storage cells is not deformable.

* * * * *